(No Model.)
W. A. TUCKER.
STUMP PULLER.
No. 276,506. Patented Apr. 24, 1883.
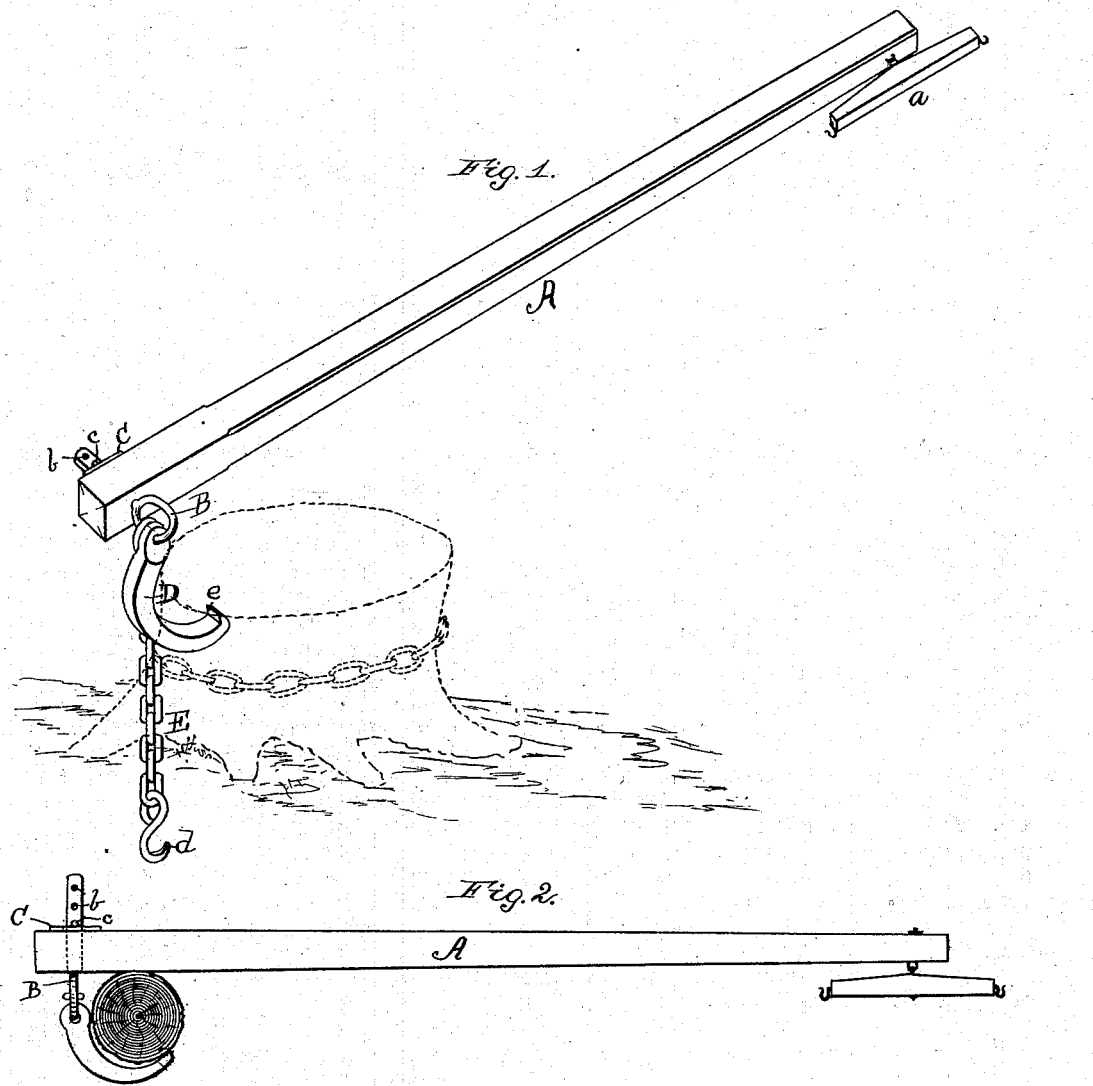
Witnesses:
J. W. Garner
W. S. O. Haines
Inventor:
Wm. A. Tucker
per H. J. Ennis
Atty.

United States Patent Office.

WILLIAM A. TUCKER, OF CLIO, TEXAS.

STUMP-PULLER.

SPECIFICATION forming part of Letters Patent No. 276,506, dated April 24, 1883.

Application filed November 21, 1882. (No model.)

*To all whom it may concern:*

Be it known that I, WILLIAM A. TUCKER, a citizen of the United States of America, residing at Clio, in the county of Brown and State of Texas, have invented certain new and useful Improvements in Stump-Pullers, of which the following is a specification, reference being had therein to the accompanying drawings.

My invention has relation to stump-pullers; and its object is to provide a simple, cheap, and effective stump-puller, readily portable and easily operated by one man and a horse; and to that end the novelty consists in the construction of the same, as will be hereinafter more fully set forth, and particularly pointed out in the claim.

In the accompanying drawings similar letters of reference indicate like parts of the invention.

Figure 1 represents a perspective, and Fig. 2 a side view.

A is a beam of any suitable length, provided at one end with a single or double tree, a. The other end is provided with an eyebolt, B, passing transversely through it. This eyebolt has holes b, through which the key-pin c passes, and by means of which the eyebolt may be adjusted. The pin c comes in contact or bears against a plate, C, which prevents injury to the beam and the enlargement of the hole c, through which the eyebolt passes.

To the eyebolt B is secured a hook, D, and a short chain, E. The hook D has a projection, e, which may be driven into the stump, as shown in Fig. 2, and by attaching the team to the single-tree the stump is forced or twisted out of the ground.

The small chain E may be used in such cases where the hook D would fail—as, for example, in large stumps the chain is passed around and the hook d driven into the wood; or in very small stumps the chain may be wrapped around them and its hook d secured in one of the links, so as to secure a firm hold on the stump.

Having thus fully described my invention, what I claim as new and useful, and desire to secure by Letters Patent of the United States, is—

The beam A, adjustable eyebolt B, having holes b, pin c, and plate C, in combination with the hook D, having tooth e, and the chain E, having hook d, by means of which stumps of various sizes may be extracted, substantially as set forth.

In testimony whereof I affix my signature, in presence of two witnesses, this 9th day of November, 1882.

WILLIAM A. TUCKER.

Witnesses:
C. R. COOK,
M. G. VERNON.